A. ROESCH.
THERMOMETER.
APPLICATION FILED MAR. 27, 1911.
996,679.
Patented July 4, 1911.
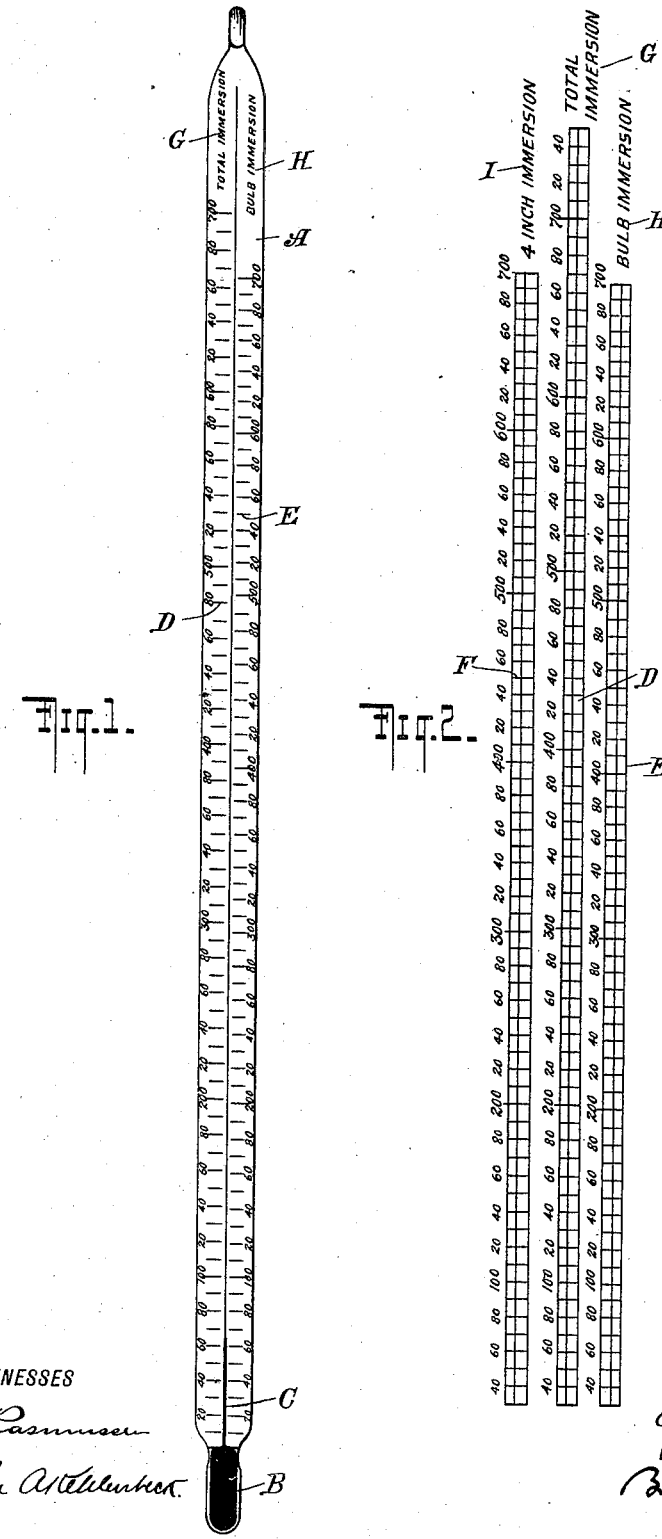

UNITED STATES PATENT OFFICE.

ALFRED ROESCH, OF NEW YORK, N. Y., ASSIGNOR TO CHARLES J. TAGLIABUE, OF BROOKLYN, NEW YORK.

THERMOMETER.

996,679.  Specification of Letters Patent.  Patented July 4, 1911.

Application filed March 27, 1911. Serial No. 617,081.

*To all whom it may concern:*

Be it known that I, ALFRED ROESCH, a citizen of the United States, and a resident of the borough of Brooklyn, county of Kings, city and State of New York, have invented certain new and useful Improvements in Thermometers, of which the following is a specification.

My invention relates to thermometers and more particularly to thermometers for taking the temperature of baths of any kind, particularly oil baths and other baths of high temperature, of sand, gravel, metal and the like and has for its object to provide such an instrument which at a glance, will give correct readings, either after being totally immersed in the bath, or in contact throughout with the medium being measured, or when its bulb only has been immersed, or in contact with said medium, or when it has been immersed, or in contact up to certain predetermined points. Heretofore, if a thermometer was used under conditions other than those corresponding to total immersion or contact, as in the case when the bulb only is immersed, or in contact or the thermometer stem projects from the medium or emerges from the bath more or less, it has been necessary to apply a correction for emergent stem, in order to obtain a correct reading. This is due to the fact that the emergent stem and mercury contained therein may be at a temperature different from that of the medium, the temperature of which is being measured so that if the thermometer were properly calibrated for total immersion or contact, and then used only with the bulb immersion or contact the point reached by the mercury thread in this last instance would not correctly indicate the temperature of the bath or other medium. To obtain a correct reading under those conditions made it necessary to carry out mathematical formula, which ofttimes were complex and many times incapable of being computed by the person using the thermometer.

The particular object of my invention is to overcome this difficulty by making the mathematical computations for projecting or emergent stem correction unnecessary and to obtain a correct reading under practically all conditions at a glance. To this end I provide my improved thermometer with a number of scales, each properly calibrated and marked for its particular purpose, that is, total immersion or contact, bulb immersion or contact, or immersion or contact of a given length of stem.

My invention will be fully described hereinafter and the features of novelty will be pointed out in the appended claims.

Reference is to be had to the accompanying drawings in which—

Figure 1 is an elevation of my improved thermometer and Fig. 2 is a diagrammatic view of three scales applied thereto in the specific form illustrated.

In the drawings A represents the thermometer stem, B the mercury bulb and C the mercury thread. In the particular and specific form of my invention illustrated in the drawings, I have shown the stem A provided with three scales, a total immersion or contact scale D, a bulb immersion or contact scale E and a four inch immersion or contact scale F. It will, of course, be understood that this is only an illustration and that more scales may be provided for different degrees of immersion or contact, or only the two scales, that is, total immersion or contact and bulb immersion or contact produced on the stem. The two last named scales being the most extensively used, will usually be sufficient.

If the thermometer is totally immersed in or in contact with the medium whose temperature is being measured, all parts of the instrument and the mercury will be subjected to the same temperature so that the mercury will be expanded to a maximum degree and will thus indicate the temperature correctly on the scale D, which is graduated for this purpose. If now the bulb B is only immersed in or in contact with the medium, the said bulb and the mercury therein will be subjected to the temperature of said medium while the stem A will be subjected to the surrounding temperature which may be considerably lower than that of the medium being measured. As the mercury rises in the stem a gradually increasing length thereof becomes affected by the said surrounding lower temperature so that the relative degree of expansion changes as the mercury continues to rise. For a given temperature, therefore, the mercury will not rise as high as is the case when the thermometer is immersed, or entirely in contact with the medium, so that if only one scale were provided graduated say for total immersion or contact, the temperature indicated by the mercury therein when the bulb only is immersed or in contact would be, for instance, 664° while the real temperature would be 700°. To obtain the correct temperature under such conditions, it would thus be necessary to resort to a mathematical calculation for emergent or projecting stem correction. To avoid this, I provide the scale E which is graduated to correctly indicate the temperature if the bulb only is immersed in or in contact with the medium under investigation. Similarly, if, for instance, four inches of the instrument is immersed, or in contact with said medium a greater portion thereof and a greater amount of mercury will be subjected to the temperature of the medium being measured and less to the surrounding lower temperature than is the case when the bulb only is immersed or in contact. For a given temperature, the mercury will, therefore, rise to a higher point on the stem than when the bulb only is immersed, or in contact with the medium, but will not rise as high as is the case when the total immersion or contact of the instrument takes place. In other words, an intermediate point or condition is reached.

It will readily be seen that even if the bulb immersion or contact scale E were provided in addition to the total immersion or contact scale D, a correct reading with four inches of the stem immersed or in contact could not be obtained from either scale without a mathematical calculation. To avoid this I provide a scale F properly graduated to give a correct reading when four inches of the stem project into or contact with the bath or other medium. Similarly additional scales may be provided properly graduated for different degrees of immersion or contact to cover all conditions which may arise. Each scale is preferably marked as shown at G, H and I respectively to indicate its respective function, so that at a glance the proper and correct temperature may be ascertained by simply referring to the scale graduated for the special condition under which the thermometer is being used. Furthermore, each scale may be compared with the other for testing purposes. That is, by calculating, for instance, how high the mercury should arise on the total immersion or contact scale at a given temperature when only the bulb is immersed, or in contact with the medium, and then immersing or contacting the bulb only and noticing the result it is easy, by comparing the two scales, to find out if the bulb immersion or contact scale is correct. It is thus a simple matter to ascertain if these two scales and likewise any additional scales which may be provided, are in accord.

It is to be understood that when speaking of total immersion or contact throughout either in the description or in the claims, I mean total immersion or contact throughout up to the degree of temperature of the medium of investigation. That is if the bath or other medium has a temperature of 300°, the thermometer is considered totally immersed or in contact throughout when all portions thereof up to the 300° indication are immersed or in contact. The claims are therefore to be construed accordingly.

Various changes in the specific form illustrated and described may be made within the scope of the claims without departing from the spirit of my invention.

I claim as my invention:

1. In a thermometer for measuring temperature, an expansible indicating medium, and a plurality of scales produced on said thermometer, each scale being graduated in proportion to the expansibility of the indicating medium under a definite extent of contact with the medium whose temperature is being measured, such extent for each scale being different from that of the other scales.

2. In a thermometer for measuring temperature, an expansible indicating medium, a plurality of scales produced on said thermometer, one scale being graduated to indicate the temperature when the thermometer is in contact throughout with the medium whose temperature is being measured, and another scale being graduated to indicate the temperature when the bulb only is in contact with said medium.

3. In a thermometer for measuring temperature, an expansible indicating medium, a plurality of scales produced on said thermometer, one scale being graduated to indicate the temperature when the thermometer is in contact throughout with the medium whose temperature is being measured, a second scale being graduated to indicate the temperature when the bulb only is in contact with said medium and a third scale being graduated to indicate the temperature when the thermometer contacts with said medium to a point intermediate of the thermometer ends.

In testimony whereof I have hereunto set my hand in the presence of two subscribing witnesses.

ALFRED ROESCH.

Witnesses:
  JOHN A. KEHLENBECK,
  LOUIS ALEXANDER.

Copies of this patent may be obtained for five cents each, by addressing the "Commissioner of Patents, Washington, D. C."